(12) United States Patent
Maass

(10) Patent No.: US 7,551,093 B2
(45) Date of Patent: Jun. 23, 2009

(54) METHOD AND DEVICE FOR WARNING A DRIVER

(75) Inventor: Alexander Maass, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 9 days.

(21) Appl. No.: 11/604,038

(22) Filed: Nov. 22, 2006

(65) Prior Publication Data

US 2007/0063855 A1 Mar. 22, 2007

Related U.S. Application Data

(63) Continuation of application No. 10/384,862, filed on Mar. 10, 2003, now abandoned.

(30) Foreign Application Priority Data

Mar. 8, 2002 (DE) ................................ 102 10 130

(51) Int. Cl.
G08B 23/00 (2006.01)
(52) U.S. Cl. .................. 340/576; 340/438; 340/439; 340/500; 340/575
(58) Field of Classification Search ................. 340/575, 340/576, 435, 436, 437, 438, 439, 521, 539.18, 340/500
See application file for complete search history.

(56) References Cited

U.S. PATENT DOCUMENTS 5,689,241 A 11/1997 Clarke et al.
5,890,083 A 3/1999 Franke et al.
6,243,015 B1 6/2001 Yeo
6,496,117 B2 12/2002 Gutta et al.
6,661,345 B1 12/2003 Bevan et al.
6,950,027 B2 * 9/2005 Banas ........................ 340/575

FOREIGN PATENT DOCUMENTS

| | | |
|---|---|---|
| DE | 19507956 | 9/1996 |
| DE | 10103401 | 8/2002 |
| DE | 10148535 | 4/2003 |
| DE | 10151014 | 5/2003 |
| DE | 10156509 | 6/2003 |
| JP | 62186034 | 8/1987 |
| JP | 5094600 | 4/1993 |
| JP | 7065295 | 3/1995 |
| JP | 7306109 | 11/1995 |
| JP | 9072811 | 3/1997 |
| JP | 9150647 | 6/1997 |
| JP | 2000351339 | 12/2000 |
| JP | 2001175999 | 6/2001 |
| JP | 2003278540 | 10/2003 |

* cited by examiner

Primary Examiner—Davetta W Goins
(74) Attorney, Agent, or Firm—Kenyon & Kenyon LLP

(57) ABSTRACT

A method and a device for warning a driver, the magnitude of the generated warning signal being a function of the probability of the driver inattentiveness.

10 Claims, 2 Drawing Sheets

METHOD AND DEVICE FOR WARNING A DRIVER

CROSS-REFERENCE TO RELATED APPLICATIONS

This application is a continuation application of prior application U.S. Ser. No. 10/384,862 filed on Mar. 10, 2003 now abandoned, which claimed priority under 35 U.S.C. § 119 to German Patent Application No. 102 10 130.2 filed on Mar. 8, 2002, all of which are incorporated herein by reference in their entirety.

FIELD OF THE INVENTION

The present invention is directed to a method and a device for warning a driver, especially for warning a driver in the event of driving errors or imminent potential dangers due to inattentiveness or tiredness.

BACKGROUND INFORMATION

From the related art, various systems are known which warn a driver of a motor vehicle when he is inattentive, especially in those cases where, due to the driver being tired, briefly nodding off or being distracted (in the following summarized as inattentiveness), the vehicle leaves, or is in imminent danger of leaving, the traffic lane. One example of such a system is shown in German Patent Application No. DE 195 07 956 where sensor elements determine the distance of the vehicle from a lane marking and the time for reaching the markings is estimated as a function of the distance and by taking additional variables into account. The driver is alerted when he is in danger of straying from the traffic lane. Problematic in such system is the difficulty of precisely ascertaining the attention state of the driver. While the change in the distance of a vehicle to a lane marking does supply indications of the driver's inattentiveness, it is difficult to reliably distinguish between a "concentrating driver" and an "inattentive driver." A large gray area exists in which neither inattention nor attentiveness of the driver may be assumed. As a consequence, the following problems result with respect to alerting the driver. If the driver is warned too early, he will encounter numerous false alarms, which are felt to be disruptive. If the driver is warned only when inattentiveness must be assumed with the highest degree of certainty, the danger exists that not all cases are covered in which the driver is inattentive.

SUMMARY OF THE INVENTION

A particular advantage of tying the intensity of a warning to at least one operating variable from which a probability of driver inattentiveness may be derived, is that, the higher the likelihood of driver inattentiveness, the more clearly the driver is alerted to the warning. Such a warning is rarely perceived as intrusive by an alert driver, yet sufficiently warns an inattentive driver.

Moreover, it is especially advantageous that a concentrating driver perceives lower, softer warnings than a driver lacking concentration. Thus, an optimal compromise between the clarity and the effectiveness of the warning is obtained.

The adaptation of the warning output is advantageously specified either as stepless or stepped dependent on the determined probability of inattentiveness.

Particularly advantageous is the implementation both in connection with acoustic warnings in which, in particular, the volume and/or the pitch are/is modified, and also optical displays in which the light intensity and/or the color and/or the size of the warning is/are altered.

The use in haptic warnings, in which the intensity of vibrations is changed, for instance, is also advantageous.

The magnitude (intensity) specifying the warning output is advantageously determined as a function of different criteria for ascertaining the attentiveness of the driver, for instance, as a function of a distance variable of the vehicle to a traffic lane reference variable (such as the center of the traffic lane, the edge marking of a traffic lane, etc.), dependent on an estimated attentiveness based on steering behavior and/or the change in the position of the accelerator pedal and/or the brake pedal, and/or dependent on the detected sitting position or posture. In this manner, essential criteria for determining the attentiveness of the driver are taken into account and linked to each other to generate the warning output.

DETAILED DESCRIPTION

Figure 1:
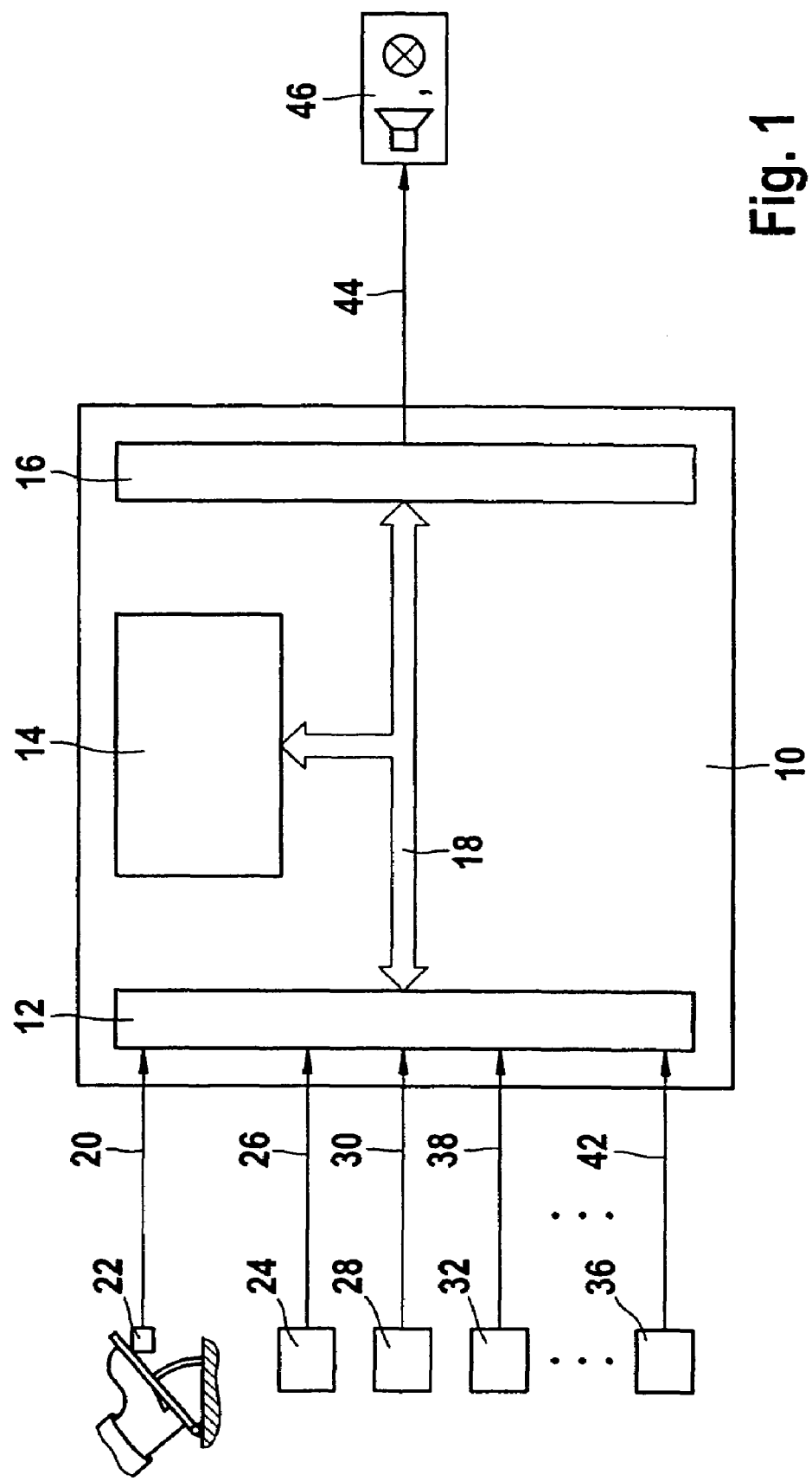
FIG. 1 shows an overall view of a control device in which steps are taken for attentiveness detection and for generating the warning output.

FIG. 1 shows a control device 10, which includes an input circuit 12, a microcomputer 14 and an output circuit 16. These elements are interconnected via a bus system 18. Input circuit 12 is supplied with input lines which connect control unit 12 to sensors for detecting operating variables, for instance, of the vehicle. For example, an input line 20 leads from a sensor 22 for detecting the accelerator pedal position to input circuit 12. From a steering-angle sensor 24, a line 26 leads to input circuit 12, while a line 30 leads from a distance sensor 28, for instance, a camera, to input circuit 12. From additional measuring devices 32 through 36 (such as a passenger-compartment camera), input lines 38 through 42 lead to control unit 10. Alternatively, it is possible to receive a plurality of input signals via a bus-transmission (for instance, a CAN bus), using fewer input lines. Via at least one output line 44, which originates from output circuit 16, control unit 10 activates at least one warning device 46, such as a loudspeaker and/or an optical and/or a haptic warning indicator. Based on the supplied measuring signals, such as the accelerator-position signal, brake-pedal position signal, steering-angle signal, the distance signal to an edge marking of the traffic lane or the estimated future distance curve and/or additional signals, such as a signal regarding the posture by a passenger-compartment camera, at least one variable representing a measure of the attentiveness or inattentiveness of the driver, and one variable for the necessity of warning the driver are determined and evaluated by the programs implemented in microcomputer 14.

These variables are then combined into a resulting variable. In one embodiment, the individual variables are linked either unchanged, for instance, or using variably defined weighting factors as a function of the operating situation, to form the resulting variable on whose basis the warning is implemented. For instance, if the warning is an acoustical warning, the volume and/or the pitch of the warning are/is specified as a function of the resulting variable. In a resulting variable which indicates that an inattentiveness of the driver is highly probable, a high volume or a high pitch is chosen. In a variable indicating only an average or low likelihood of driver inattentiveness, a comparatively softer volume or lower pitch is chosen. If an optical display is involved, the light intensity and/or color and/or size are specified as a function of the resulting variable. For instance, if the color changes from green, for a low probability of inattention, to red for a high probability, the changes occur correspondingly, from small to large and/or from low light intensity to high.

Figure 2:
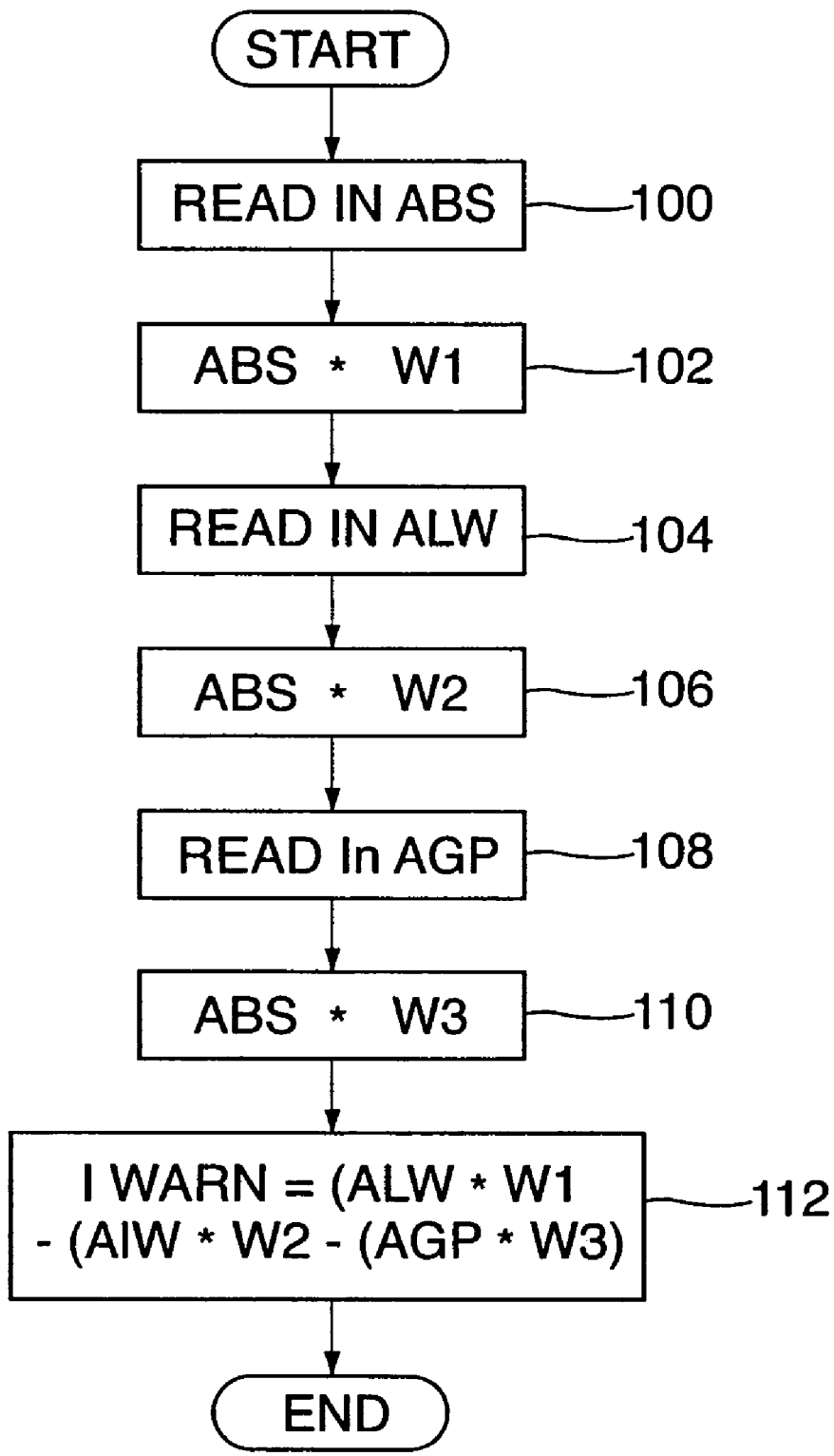
FIG. 2 shows a flow chart for generating the warning output in a preferred exemplary embodiment.

A preferred exemplary embodiment for realizing such a program is shown in FIG. 2 with the aid of a flow chart.

The program sketched in FIG. 2 is run through at specified time intervals. In first step 100, the distance Abs of the vehicle from an edge marking of the traffic lane, such as the center marking or an edge marking, is read in, or the future distance of the vehicle from an edge marking of the traffic lane, such as the center marking or an edge marking, is estimated. An example of determining such a distance is known from the related art mentioned in the introduction. In the preferred exemplary embodiment, future distance values are extrapolated from the instantaneous and the past distance values, the necessity of a driver warning being assumed in the event of the vehicle approaching the edge marking with a corresponding reduction in the estimated distance, or in the event of an imminent crossing of the marking. In the following step 102, the estimated future distance is weighted by a weighting factor W1. In the next step 104, an attentiveness factor ALW, which is derived from the steering angle, is read in. To form this factor, successively occurring steering angles are read in and the changes analyzed. For example, the factor is determined from the gradient and/or the frequency of the angle changes and/or the intervals of successively occurring steering-angle changes as dictated by characteristic curves, characteristics maps and tables. It is essential here that the factor increase inversely as the steering movements slow down or get less. This is an indication of driver inattentiveness.

The attentiveness factor ALW is weighted with a second weighting factor W2 in step 106. Then, in step 108, an attentiveness factor derived from the accelerator position is read in. Analogously to the steering angle, this factor is determined, for instance, from the gradient and/or the frequency of the angle changes and/or the intervals of successively occurring accelerator-position changes according to characteristic curves, characteristic maps, tables, the factor increasing as the changes in the accelerator position decrease. The latter indicates inattentiveness. In the following step 110, this factor is weighted with the weighting factor W3. Additional variables estimating the attentiveness of the driver may subsequently be incorporated according to the same principle. Then, in step 112, the intensity of the warning Iwarn is derived from the weighted variables. For this purpose, the weighted attentiveness factors are deducted from the basic value determined from the estimated instantaneous or future distance to the traffic lane. A warning is then output whose intensity is a function of the resulting variable Iwarn. This means that, the greater this resulting variable, the louder the acoustical, or the more distinct the optical warning display. The program is then ended and run through again at the next time.

In another variant, the basic value may be derived in some other fashion. For instance, the variable may be generated as a function of falling below a predefined value that is dependent on the vehicle speed.

In a preferred exemplary embodiment the weighting factors W1 through W3 are a function of operating variables. For instance, at high speeds the accelerator factor is rated higher than the steering-angle factor, whereas the distance value is weighted more heavily. At low speeds, it may be useful to assign a higher importance to the steering-angle factor than to the accelerator factor.

In addition, or instead of the steering-angle dependency and/or the accelerator-position dependency in the generation of the inattentiveness factors, other criteria may be utilized, such as a change in posture, especially of the head, an inattentiveness factor being increased when a turning of the head is detected or a forward pitching of the body. The body posture is being detected by a passenger-compartment camera, for example.

When acoustic displays are used, the volume change occurs as a function of the detected warning-intensity variable, in a stepless fashion or in several steps. In optical displays, depending on the design, the size of the display, the color of the display and/or the intensity of the display is/are changed as a function of the warning intensity.

The preferred application of the described procedure is in combination with a so-called lane-stray warner. However, the above measures are also advantageously used in other applications, namely wherever a warning signal is formed to warn a driver of a hazard, such as in a warning due to an insufficient distance, etc., the attentiveness of the driver playing an important role in the effectiveness of the warning.

What is claimed is:

1. A method for adaptively warning a driver, comprising:
   implementing a warning by at least one of an acoustic, an optical and a haptic indicator;
   deriving a variable that represents a degree of a driver's inattentiveness at a selected point in time, from at least one operating variable; and
   generating an initial warning signal that is adapted to the degree of the driver's inattentiveness at the selected point in time, wherein a magnitude of the initial warning signal is varied depending upon the variable that represents the degree of the driver's inattentiveness at the selected point in time.

2. The method according to claim 1, further comprising modifying, in an acoustical warning, at least one of a volume and a pitch, wherein the magnitude of the acoustical warning is independent of a duration of driver inattentiveness.

3. The method according to claim 1, further comprising modifying, in an optical warning, at least one of an intensity, a color and a size of the optical warning, wherein the magnitude of the optical warning is independent of a duration of driver inattentiveness.

4. The method according to claim 2, wherein the warning signal is generated as a function of at least one of an instantaneous and a future estimated distance of a vehicle to a demarcation of a traffic lane of the vehicle.

5. The method according to claim 2, wherein the at least one operating variable includes at least one of a steering angle, an accelerator position, a brake-pedal position, a sitting posture and a posture of a driver.

6. The method according to claim 2, further comprising determining a plurality of operating variables from which factors representing a measure of a driver's inattentiveness are generated, which are linked to form a variable.

7. The method according to claim 2, further comprising determining a plurality of operating variables from which factors are formed which, weighted differently, are linked to form a variable representing an intensity of the warning.

8. The method according to claim 2, wherein the factors are a function of operating variables.

9. A method for warning a driver, comprising:
   implementing a warning by at least one of an acoustic, an optical and a haptic indicator;

deriving a variable that represents a degree of a driver's inattentiveness, from at least one operating variable; and generating a warning signal, wherein a magnitude of the warning signal is varied depending upon the variable that represents the degree of the driver's inattentiveness, and wherein the magnitude of the warning signal is independent of a duration of driver inattentiveness.

10. A device for adaptively warning a driver, comprising:

a control unit for receiving at least one operating variable, deriving a variable that represents a degree of a driver's inattentiveness at a selected point in time, based on the at least one operating variable, and outputting an initial warning signal that is adapted to the degree of the driver's inattentiveness at the selected point in time, the control unit including means for generating the warning signal, the control unit further including means for specifying a magnitude of the warning signal that varies depending upon the variable that represents the degree of a driver's inattentiveness at the selected point in time.

* * * * *